UNITED STATES PATENT OFFICE.

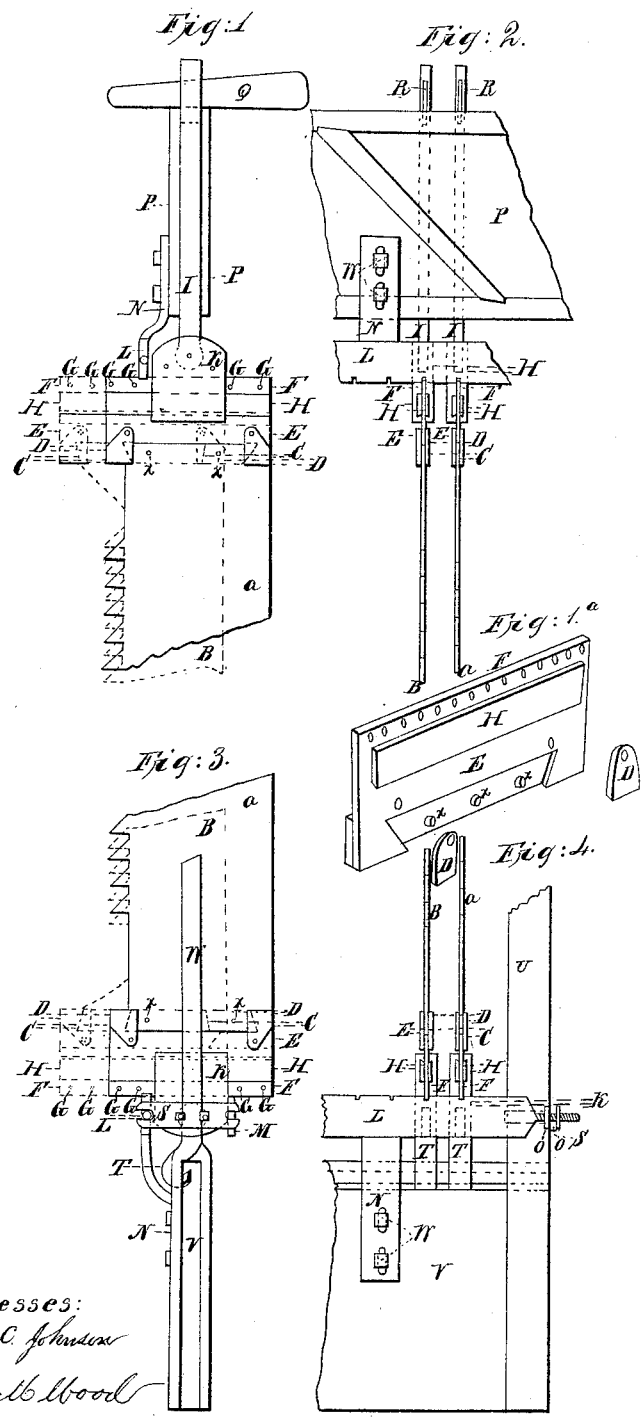
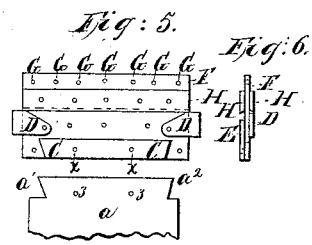
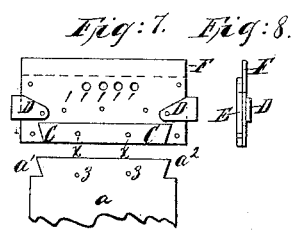
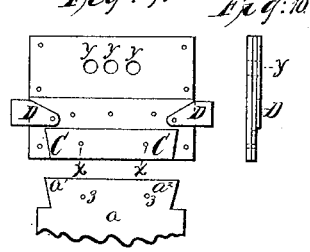
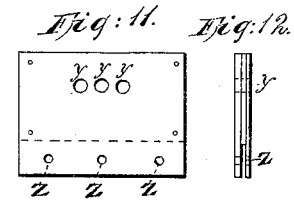

EMANUEL ANDREWS, OF WILLIAMSPORT, PENNSYLVANIA.

IMPROVEMENT IN SAW-MILLS.

Specification forming part of Letters Patent No. 51,126, dated November 28, 1865.

*To all whom it may concern:*

Be it known that I, EMANUEL ANDREWS, of Williamsport, in the county of Lycoming and State of Pennsylvania, have invented a certain new and useful Improvement in Making and Hanging Reciprocating Saws; and I do hereby declare that the following is a full, clear, and exact description of the same, reference being had to the annexed drawings, making part of this specification, in which—

Figure 1 is a side view of my invention applied at the top of gang-saws. Fig. 2 is a front view of the same. Fig. 3 is a side view of my invention applied at the bottom of gang-saws. Fig. 4 is a front view of the same. Fig. 1ª is a perspective view of the detachable plate, and of the buttons thereon disconnected, and on a larger scale.

The additional figures represent details and modifications described farther on.

Similar letters of reference indicate like parts in the several figures.

I cut the ends of my saw-plates in a dovetailed form, either by hand or by suitable machinery, and I apply separate plates at the ends, in such a manner that the plates can be readily detached from one saw and applied to another saw of the like kind. They strengthen the ends of the saw. They also enable sawyers to remove gang-saws and fill the place with others very expeditiously and without disturbing the gage-rods, and they allow saws of different widths to be used in the same gate.

Cleats and variously-formed plates have heretofore been fixed to and used on the extreme ends of saw-blades to give strength, but they were made a part of the saw by riveting pieces of iron or steel on each side of the saw-plate. This mode is inconvenient and expensive, and does not accomplish the desired ends, as it is necessary to drill many holes in each end of the saw for the tug pin or hook before the saw is worn out, and every hole not only involves labor in producing and accurately fitting it, but has a tendency to weaken the saw at that point, and it is very seldom that plates thus used can be afterward removed and successfully applied to other saws. When cleats so attached are used with jaws to strain saws it is found very difficult to fit the two together so as to have the jaws draw equal on both cleats because cleats will move out of place during the process of riveting, and it becomes necessary to fit them by filing, and the same work must be done anew every time a new saw is wanted. Another objection to cleats thus riveted on the ends of saws is that the rivets are very liable to tear out with pieces of the saw-blade, and the saw is then too short to be used. Where gang-saws are used with hook-strainers it is the usual practice to apply the gage-rod on the front edge of the saws. This makes it necessary to have the saws of a uniform width in order to allow them to be properly strained, and causes much inconvenience.

My arrangement can be applied to any of the usual modes of straining, and gives strength to the weak parts, besides enabling me to use shorter saws than are commonly employed.

To enable others skilled in the art to make and use my invention, I will proceed to describe its construction and operation by the aid of the drawings and of the letters of reference marked thereon.

$a$ is a saw of the usual width.

B (in red outline) is a saw partly worn out. The saws are dovetailed at the ends, as indicated at $a'$ $a^2$, and fit into dovetailed recesses C in my separate plates E, which are each composed of a main part and of a side part, E', riveted thereto. The saws have holes 3 punched at each end. These fit pins $x$ $x$, which are riveted to plate E and project about the thickness of the saw-blade $a$. By means of these pins and the tapering edges of the dovetails $a'$ and $a^2$ the strain on the saw-blade is properly transferred to the plate E. The pins $x$ may be many or few, as preferred. I prefer a small number, as it involves less punching of the saw. They prevent too much strain from coming on the dovetail either at the back or front edge of the saw-blade.

D D are buttons to fasten the saw $a$ and plate E together and allow a saw to be readily removed from or attached to the plates.

H H are cleats riveted or otherwise firmly fixed on the sides of the plate E, and beveled or overhung on the edges to correspond with the lips at the bottom of the buckle or jaws K. By means of these cleats H H and buckle K, applied together, as represented, the saws are strained in the saw-gate from the top in the usual manner, as represented.

F is a projecting end of the saw-blade $a$, which extends beyond cleat H to allow any suitable gage-rod—such, for example, as is indicated by L—to be placed at the extreme top and bottom of saw, for the purpose of allowing gang-saws to be removed from saw-gate without disturbing the gage-rods, and also of fixing the gage-rods more securely against being bent or displaced by slivers, projecting knots, &c., encountered in gang-sawing.

G G G are holes in projection F, through one of which holes a pin may be put to prevent the saws from working backward through buckle K.

P P is the upper girt or cross-piece of the saw-gate.

N is a brace to hold down the gage-rod L. It is attached to the girt P by set-screws passing through slots W, (see Fig. 2,) by which means they can be adjusted should girt P spring out of line. One or more of these braces N are used, according to the width of the saw-gate.

T (see Fig. 3) is a hook attached to the buckle K. U is a stile of the saw-gate.

V is the lower girt of saw-gate. It is made with a peculiar groove near the upper edge, into which hook T is fitted.

S is a piece of iron with slots at each end, fixed on the stile of saw-gate by the clevis indicated, or by any suitable means. To this the gage-rod L and a flat rod of iron, $m$, shaped at the ends like gage-rod L, are attached. The rod $m$ is placed at the back of the buckle K, while the gage-rod L is at the front. Both are used to keep the buckle K in an upright position when changing saws.

O O (see Fig. 4) are nuts, by which means the gage-rod L is adjusted and held in place in slotted piece S.

Fig. 5 shows a plate for saws detached, with button D D turned up to receive saw, which is outlined a little lower. It is arranged for the cleat-and-buckle method of hanging saws. Fig. 6 is an edge view of the same. In Fig. 7 the plate is arranged for gang-saws when used with top and bottom hooks for straining; 1 1 1 1, holes for hooks, by means of which the saws can be readily advanced forward as they wear back. Fig. 8 is an edge view of the same. Fig. 9 shows the plates arranged for English mill-saws when used with tug-pin hangers. Holes $y\ y\ y$ for the tug-pin admit of a ready change from hole to hole as the saw wears out or requires greater or less rake in sawing different kinds of wood. Fig. 10 is an edge view of the same. Fig. 11 shows the plates arranged for common reciprocating saws. These can be readily attached to saws without dovetailed ends, by means of short bolts through holes $z\ z\ z$. Instead of bolts rivets may be used, which can be punched out in changing the plates from one saw to another. Fig. 12 is an edge view of the same.

The construction shown in Figs. 11 and 12 is better than those now generally used; but I prefer that shown in the preceding figures, because the dovetail $a'\ a^2$ gives greater strength to the saw by assisting to take the strain due to the tension thereon.

It will be seen that the position of gage-rods at the top and bottom of saws is much better than at the front and back edge of saw, where it has been heretofore generally used, as it enables the sawyer to advance or set back his saw readily, to give more or less rake, and the use of saws of different widths.

I do not claim hanging reciprocating saws by means of cleats and buckles or jaws, for such are not new; but

Having now fully described my invention, what I claim as new in saw mechanism, and desire to secure by Letters Patent, is as follows:

1. The construction and use of the plates E E', adapted to be readily connected and disconnected with the saw, substantially in the manner and for the purposes herein set forth.

2. The dovetailed ends $a'\ a^2$ on the saw $a$, adapted for use, in combination with detachable plates E, or their equivalents, and the buttons D, or equivalent stops, arranged substantially in the manner and for the purposes herein set forth.

3. The projecting ends F F, projecting beyond the cleats at the top or bottom of saws, or of their attachments, so arranged as to allow any suitable gage-rods to be applied on the ends, substantially as herein described, and for the purposes set forth.

EMANUEL ANDREWS.

Witnesses:
T. D. STETSON,
D. W. STETSON.